UNITED STATES PATENT OFFICE 2,421,090

LONG CHAIN ALIPHATIC HALIDES AND METHOD OF PREPARING SAME

Lee Irvin Smith and Joseph A. Sprung, Minneapolis, Minn., assignors to Regents of the University of Minnesota, Minneapolis, Minn., a corporation of Minnesota No Drawing. Application August 1, 1942, Serial No. 453,281

8 Claims. (Cl. 260—652)

This invention relates to the new compounds, 4,8,12-trimethyl-tridecyl halides and to the methods of making the same. These compounds are intermediates and have particular usefulness in the preparation of certain starting materials used in the synthesis of tocopherols.

It is an object of this invention to provide the new compounds, 4,8,12-trimethyl-tridecyl bromides and chlorides, and to provide methods of making these new compounds.

In carrying out the invention there is utilized as a starting material a gamma-alkoxy or gamma-aryloxylpropyl magnesium halide having structure:

I     X—Mg—CH₂CH₂CH₂—OR where X is chlorine or bromine and R is a short chain, aliphatic alkyl having not more than 5 carbons, such as methyl, ethyl, propyl, butyl, or amyl, or a simple aryl, such as benzyl. Of these, it is preferred that R be methyl, ethyl or benzyl, since these can be more readily cleaved. The R group is subsequently removed in the reaction and it is, therefore, desirably, a simple radical which may be cleaved with facility, as will subsequently appear.

The gamma-alkoxy or gamma-aryloxypropyl magnesium halide is reacted with the ketone, pseudoionone, having the Structure II according to the following reaction:

I     X—Mg—CH₂CH₂CH₂—OR

Gamma-alkoxy or aryloxypropyl magnesium halide

+

II    (CH₃)₂C=CH—CH₂CH₂C=CH—CH=CH—CO—CH₃
                                                    CH₃

Pseudoionone

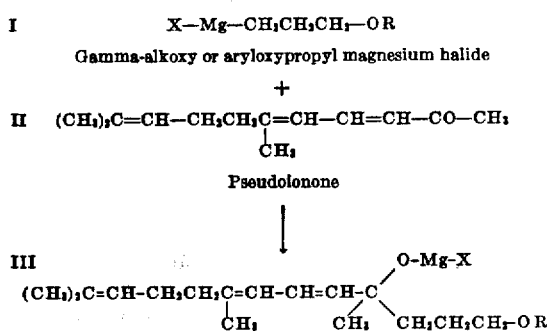

The compound, Structure III, need not be isolated, but is hydrolyzed to compound IV, preferably by slightly acidifying, so as to facilitate subsequent removal of the magnesium. Compound IV is dehydrated by any convenient procedure, such as distillation or warming, and the final product of these reactions is the unsaturated ether V. These steps are illustrated by the following equation:

Compound III

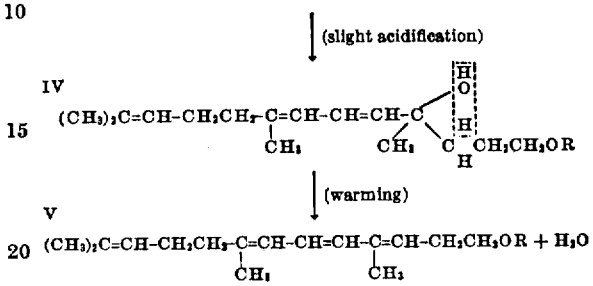

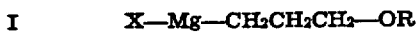

Ether of 4,8,12-trimethyl-tridecatetraene-3,5,7,11-ol-1

The resultant ether V is then purified by any convenient procedure, preferably by distillation, and is then reduced, preferably by direct hydrogenation, in the presence of a catalyst. Raney nickel catalyst is convenient and relatively economical, though other catalysts, such as finely divided platinum, are also satisfactory. Hydrogenation may be accomplished by the batch method in a high pressure vessel or "bomb." These steps are represented as follows:

Ether V

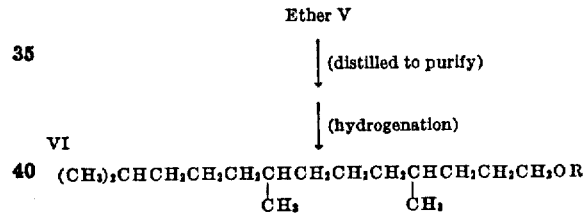

Ether of 4,8,12-trimethyl-tridecanol-1

The resultant ether of 4,8,12-trimethyl-tridecanol-1 is then cleaved and converted to the corresponding halide by action of a halide acid, e. g., hydrogen bromide or hydrogen chloride. Hydrogen bromide is preferred because of favorable reaction temperatures.

This step of the reaction may be represented as follows:

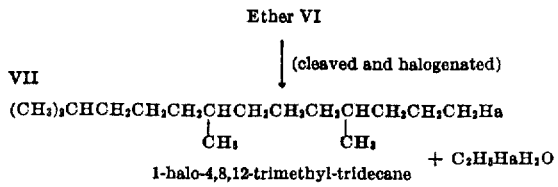

1-halo-4,8,12-trimethyl-tridecane where Ha may be bromide or chlorine. The resultant halides are useful intermediates for many purposes, particularly in preparing starting ingredients for the synthesis of the tocopherols and related compounds. The cleavage of the ether radical can be accomplished at relatively low temperatures by the use of hydrobromic acid, whereas hydrochloric acids require much higher temperatures and pressures and heavy working equipment. For this reason bromide cleavage is preferred.

The following examples are given as further illustrations of the methods and products involved but are not to be understood as limitations upon the broader aspects of the invention illustrated, described and claimed.

Example I

Pure pseudoionone was treated with gamma-ethoxypropyl magnesium bromide in the following manner. A small portion of a solution of 96 grams (0.5 mole) of pseudoionone, 100 grams (0.6 mole—20% excess) of gamma-ethoxypropyl bromide in 375 cc. of dry ethyl ether was dropped upon 15.2 grams (0.625 mole—25% excess) of magnesium. The Grignard may usually be started by the application of heat, but sometimes it may be necessary to add a few drops of ethyl bromide or a crystal of iodine to initiate the reaction. When the reaction was well under way, the remainder of the mixture of the reactants was added as rapidly as was conveniently possible. The reaction was completed by heating the ingredients for 30 minutes. The ether solution was decanted from the unreacted magnesium, decomposed with cold hydrochloric acid, washed with water and dried over anhydrous sodium sulfate. Upon evaporation of the solvent, water began to split out and the dehydration was completed by heating the residue on a steam bath for 30 minutes. The water was removed with anhydrous sodium sulfate and the remaining orange colored oil decanted. The drier (Na$_2$SO$_4$) was washed with a little ether and this was added to the oil and the resultant mixture was distilled at 3 mm. mercury pressure. The product distilled at 163–165° C./3 mm. in an atmosphere of nitrogen. The yield was 52% and the compound had a refractive index of $n_D^{25}=1.5242$. The product was a yellow colored oil which slowly formed a sticky, glassy solid upon exposure to air.

The product, namely the ethyl ether of 4,8,12-trimethyltridecatetraene-3,5,7,11-ol-1, when analyzed was found to contain 82.09% carbon and 11.25% hydrogen, whereas theoretical percentages calculated for C$_{18}$H$_{30}$O are 82.38% carbon and 11.51% hydrogen.

The ethyl ether of 4,8,12-trimethyl-tridecatetraene-3,5,7,11-ol-1 was reduced with hydrogen in the presence of Raney nickel at 125° C. under 2000# per square inch pressure. No solvent was used, but a solvent such as ethyl or methyl alcohol may be used if desired. The reduction started at 50° C. and the absorption of 3 moles of hydrogen was accomplished in one hour, but to insure complete reduction of the remaining double bond, the bomb was heated to 125° C. and shaken for one hour after apparent absorption had ceased. In instances where the catalyst was poisoned due to some impurity in the bomb or in the compound, no absorption of hydrogen started to take place until the temperature was raised to 100° C. In such cases about 3 moles of hydrogen were very slowly taken up (2–3 hours) and the fourth mole was not absorbed even after prolonged heating at 150° C. In order to overcome such a difficulty, the compound was removed and filtered through "Hy-flo" or any other suitable filtering material capable of removing the poisoned catalyst. The filtrate was then resealed with fresh catalyst and the reduction continued.

The reduced compound, namely, the ethyl ether of 4,8,12-trimethyl-tridecanol-1, Structure VI, was completely colorless and distilled at 138–140° C./3 mm.; refractive index $n_D^{25}=1.4370$. The average yield was about 82% and the compound analyzed 80.16% carbon and 14.11 hydrogen whereas theoretical percentages of these ingredients calculated for C$_{18}$H$_{38}$O are 79.91% carbon and 14.17% hydrogen.

The ethyl ether of 4,8,12-trimethyl-tridecanol-1 (Structure VI) may be cleaved and the corresponding bromide formed by appropriate procedures. The following variations of this step are illustrative of the results which may be expected by variations in technique.

(a) A 200 cc. three-necked flask was provided with an inlet tube having a perforated bulb at the end, a thermometer and a downward condenser connected thereto.

The ethyl ether of 4,8,12-trimethyl-tridecanol-1 was placed in the flask and a rapid stream of dry hydrogen bromide passed into the flask through the perforated inlet tube for 8 hours, the temperature being maintained at 185–200° C. At this temperature, water formed in the reaction was rapidly volatilized and discharged into the condenser where it was collected along with some of the reaction products from the flask. The distillate separated in two layers and the upper layer was returned to the reaction flask from time to time. The mixture was worked up by pouring into ice water, then extracted with ethyl ether, washed with water and dried over anhydrous sodium sulfate.

As a result of this procedure there is produced a mixture of 1-bromo-4,8,12-trimethyl-tridecane and the corresponding uncleaved ethyl ether. The refractive indices in several runs at 25° C. were 1.4555 and 1.4568 indicating that 75 to 85% of the ether had been cleaved.

(b) The cleavage and bromide conversion may also be carried out in solvents. Thus, the same apparatus as in (a) may be used, the upright condenser being cooled with cold water. Fifty grams of the ethyl ether of 4,8,12-trimethyl-tridecanol-1 (refractive index $n_D^{25}=1.4370$) was dissolved in 50 cc. of glacial acetic acid and a slow stream of hydrogen bromide passed into the mixture for 5 hours while maintaining the temperature at the boiling point of the solvent, i. e., 115° C. Two layers were present at the end of the heating period. The cooled mixture was neutralized with sodium carbonate and worked up as in paragraph (a). The product boiled at 135–140°

C./3 mm. of Hg pressure and weighed 51 grams. Its refractive index was $n_D^{25}=1.4561$ indicating that it consisted of 80% of the bromide and 20% uncleaved ether. The mixture was rehydrolyzed (recleaved) for an additional 5 hours. The product when worked up as in paragraph (a) above, weighed 47 grams, had a refractive index of $n_D^{25}=1.4568$ and contained about 85% of 1-bromo-4,8,12-trimethyl-tridecane.

(c) The cleavage and formation of the bromide (Structure VII) may also be carried out under elevated temperatures and pressures. Thus, 25 grams of glacial acetic acid were saturated at 0° C. with 11.0 grams (0.135 mole) of dry hydrogen bromide. It was mixed with 10.0 grams (0.037 mole) of the ethyl ether of 4,8,12-trimethyl-tridecanol-1, sealed in a Carius tube and heated at 150° C. for 6 hours. Two layers were present when the tube was opened. The product was worked up as in paragraph (a) above, boiled at 135–138° C./3 mm. of Hg pressure and had a refractive index $n_D^{25}=1.4598$. The cleavage and bromide formation in this instance was 96%.

It may be pointed out that pure 1-bromo-4,8,12-trimethyl-tridecane may be prepared by washing the mixtures of 1-bromo-4,8,12-trimethyl-tridecane and the ether thereof with concentrated sulfuric acid.

Thus, a portion of the mixture from paragraph (b) above, consisting of about 85% of the bromide and 15% of the uncleaved ethyl ether was mixed with about ⅓ as much, by weight, of concentrated sulfuric acid. This was allowed to stand overnight, the resultant upper layer separated, and dissolved in ethyl ether, washed with dilute sodium carbonate solution and dried over anhydrous sodium sulfate. The pure 1-bromo-4,8,12-trimethyl-tridecane had a boiling point of 138–140° C./3 mm. Hg pressure and had a refractive index of $n_D^{25}=1.4598$. Upon analysis it was found to contain 63.04% carbon and 11.97% hydrogen whereas theoretical percentages of these elements calculated for $C_{16}H_{33}Br$ are 62.88% carbon and 10.89% hydrogen.

The refractive index determination is a convenient means of determining the concentration of 1-bromo-4,8,12-trimethyl-tridecane present in a mixture of that compound and the ether of 1-bromo-4,8,12-trimethyl-tridecanol-1, since the refractive indices of the two compounds, at the same wave length, are quite widely separated and the refractive index of the mixture falls between the two extremes. Hence, the closer the refractive index of the mixture of the two compounds approaches that of the pure bromide compounds, the greater the percentage of bromide present. Thus, the refractive index measurement facilitates control during the cleaving operation inasmuch as the operator may take a sample from time to time and thus gauge the progress of the reaction.

It may be pointed out that the chlorides may be prepared by utilizing higher temperatures and pressures and suitable pressure equipment.

*Example II*

The benzyl ether of 4,8,12-trimethyl-tridecatetraene-3,5,7,11-ol-1 and the halides thereof may be prepared by procedures similar to those used in Example I. Thus, 15.6 grams (0.081 mole) of pseudoionone, 22.9 grams (0.10 mole) of gamma-benzyloxypropyl bromide and 2.7 grams (0.11 mole) of magnesium in 75 cc. of dry ether were reacted as in Example I. The resultant benzyl ether of 4,8,12-trimethyl-tridecatetraene-3,5,7,11-ol-1 boiled at 210–220° C./3 mm. Hg pressure at which temperature partial decomposition took place. The tetraene, after purification by distillation, was reduced with hydrogen at 125° C. and 2000# pressure, in the presence of Raney nickel catalyst, as in Example I. The crude material was refluxed with a mixture of 15 cc. of 48% aqueous hydrobromic acid and 15 cc. of glacial acetic acid for 5½ hours and then was worked up as in Example I (a). Upon distillation, two fractions were obtained: the first having a boiling point of 75–80° C./10 mm. Hg pressure, was benzyl bromide (lachrymator); and the second having a boiling point of 140–145° C./35 mm. Hg pressure and a refractive index of $n_D^{25}=1.4600$, was the desired 1-bromo-4,8,12-trimethyl-tridecane.

*Example III*

The methyl ether of 4,8,12-trimethyl-tridecanol-1 was prepared from 28.8 grams (0.15 mole) of unpurified pseudoionone, 25 grams (0.16 mole) of gamma-methoxypropyl bromide and 4.4 grams (0.18 mole) of magnesium in 120 cc. of dry ethyl ether. The procedure was similar to that of Example I and the resulting methyl ether of 4,8,12 - trimethyl - tridecatetraene - 3,5,7,11 - ol-1 boiled at 150–160° C./3 mm. Hg pressure; yield 19.9 grams; 53.5%. The wide boiling point range was due to impurities in the pseudoionone. The tetraene, after purification, was reduced with hydrogen in the presence of Raney nickel catalyst, at 125° C., 2000#/sq. in. pressure, and the resultant methyl ether of 4,8,12-trimethyl-tridecanol-1 was cleaved and halogenated with dry hydrogen bromide at 180° C. for 4 hours as in Example I. The resultant 1-bromo-4,8,12-trimethyl-tridecane had a refractive index of $n_D^{25}=1.4594$ indicating about 95% cleavage and bromide formation. The methyl ether of 4,8,12-trimethyl-tridecanol-1 is cleaved more readily than the corresponding ethyl ether.

Many variations will be apparent to those skilled in the art, and are intended to be within the purview of the invention herein described, illustrated and claimed.

What we claim is:

1. The new product 1-halo-4,8,12-trimethyl-tridecane where the halogen is selected from the group consisting of bromine and chlorine.

2. The new product, 1-bromo-4,8,12-trimethyl-tridecane.

3. The new product, 1-chloro-4,8,12-trimethyl-tridecane.

4. The process of preparing 1-halo-4,8,12-trimethyl-tridecane which comprises reacting pseudoionone with a Grignard reagent having the structure

X—Mg—CH₂CH₂CH₂—OR where X is selected from the group consisting of bromine and chlorine and R is selected from the group consisting of methyl, ethyl, propyl, butyl, amyl and benzyl radicals, hydrolyzing the thus formed compound under acidic conditions, dehydrating the thus formed compound by means of heat, removing the thus liberated water, hydrogenating to saturation and then transforming the resultant ether of 4,8,12-trimethyl-tridecanol-1 by reaction with a hydrogen halide selected from the group consisting of hydrogen chloride and hydrogen bromide.

5. The process of preparing 1-bromo-4,8,12-trimethyl-tridecane which comprises reacting pseudionone with a Grignard reagent having the structure BrMg—CH₂CH₂CH₂OR where R is selected from the group consisting of methyl, ethyl, propyl, butyl, amyl and benzyl radicals, hydrolyzing the thus formed compound under acidic conditions, dehydrating the thus formed compound by means of heat, removing the water thus liberated, hydrogenating to saturation and then transforming the resultant ether of 4,8,12-trimethyl-tridecanol-1 by reaction with hydrogen bromide.

6. The process of preparing 1-halo-4,8,12-trimethyl-tridecane which comprises heating pseudoionone with gamma-ethoxypropyl magnesium bromide, hydrolyzing the thus formed compound under acidic conditions, dehydrating the thus formed compound by means of heat, removing the water thus liberated, hydrogenating to saturation and transforming the resultant ether by reaction with a hydrogen halide selected from the group consisting of hydrogen chloride and hydrogen bromide.

7. The process of preparing 1-halo-4,8,12-trimethyl-tridecane which comprises heating pseudoionone with gamma benzyloxypropyl magnesium bromide, hydrolyzing the thus formed compound under acidic conditions, dehydrating the thus formed compound by means of heat, removing the water thus liberated, hydrogenating to saturation and transforming the resultant ether by reaction with a hydrogen halide selected from the group consisting of hydrogen chloride and hydrogen bromide.

8. The process of preparing 1-halo-4,8,12-trimethyl-tridecane which comprises heating pseudoionone with gamma methoxypropyl magnesium bromide, hydrolyzing the thus formed compound under acidic conditions, dehydrating the thus formed compound by means of heat, removing the water thus liberated, hydrogenating to saturation and transforming the resultant ether by reaction with a hydrogen halide selected from the group consisting of hydrogen chloride and hydrogen bromide.

LEE IRVIN SMITH.
JOSEPH A. SPRUNG.

REFERENCES CITED

The following references are of record in the file of this patent:

UNITED STATES PATENTS

| Number | Name | Date |
|---|---|---|
| 2,015,706 | Brooks | Oct. 1, 1935 |
| 2,122,812 | Groll et al. | July 5, 1938 |

OTHER REFERENCES

Williams, "Introduction to Organic Chemistry," third edition, pp. 44, 46.

Beilstein, "Handbuch der Organischen Chemie," vol. 1, p. 172; "Erganzungswerk," vol. 1, p. 65.

Chemical Abstracts, vol. 31, col. 3931 (1937). Abstract of article by Raudnitz et al. in "Berichte der Deut." Chem. Ges., vol. 70B, pp. 463–5 (1937).

---

Certificate of Correction

Patent No. 2,421,090.   May 27, 1947.

LEE IRVIN SMITH ET AL.

It is hereby certified that errors appear in the printed specification of the above numbered patent requiring correction as follows: Column 4, line 27, for "14.11 hydrogen" read *14.11% hydrogen*; column 6, line 29, for "53,5%" read *53.5%*; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.* dionone with a Grignard reagent having the structure

BrMg—CH₂CH₂CH₂OR where R is selected from the group consisting of methyl, ethyl, propyl, butyl, amyl and benzyl radicals, hydrolyzing the thus formed compound under acidic conditions, dehydrating the thus formed compound by means of heat, removing the water thus liberated, hydrogenating to saturation and then transforming the resultant ether of 4,8,12-trimethyl-tridecanol-1 by reaction with hydrogen bromide.

6. The process of preparing 1-halo-4,8,12-trimethyl-tridecane which comprises heating pseudoionone with gamma-ethoxypropyl magnesium bromide, hydrolyzing the thus formed compound under acidic conditions, dehydrating the thus formed compound by means of heat, removing the water thus liberated, hydrogenating to saturation and transforming the resultant ether by reaction with a hydrogen halide selected from the group consisting of hydrogen chloride and hydrogen bromide.

7. The process of preparing 1-halo-4,8,12-trimethyl-tridecane which comprises heating pseudoionone with gamma benzyloxypropyl magnesium bromide, hydrolyzing the thus formed compound under acidic conditions, dehydrating the thus formed compound by means of heat, removing the water thus liberated, hydrogenating to saturation and transforming the resultant ether by reaction with a hydrogen halide selected from the group consisting of hydrogen chloride and hydrogen bromide.

8. The process of preparing 1-halo-4,8,12-trimethyl-tridecane which comprises heating pseudoionone with gamma methoxypropyl magnesium bromide, hydrolyzing the thus formed compound under acidic conditions, dehydrating the thus formed compound by means of heat, removing the water thus liberated, hydrogenating to saturation and transforming the resultant ether by reaction with a hydrogen halide selected from the group consisting of hydrogen chloride and hydrogen bromide.

LEE IRVIN SMITH.
JOSEPH A. SPRUNG.

REFERENCES CITED

The following references are of record in the file of this patent:

UNITED STATES PATENTS

| Number | Name | Date |
|---|---|---|
| 2,015,706 | Brooks | Oct. 1, 1935 |
| 2,122,812 | Groll et al. | July 5, 1938 |

OTHER REFERENCES

Williams, "Introduction to Organic Chemistry," third edition, pp. 44, 46.

Beilstein, "Handbuch der Organischen Chemie," vol. 1, p. 172; "Erganzungswerk," vol. 1, p. 65.

Chemical Abstracts, vol. 31, col. 3931 (1937). Abstract of article by Raudnitz et al. in "Berichte der Deut." Chem. Ges., vol. 70B, pp. 463–5 (1937).

---

Certificate of Correction

Patent No. 2,421,090.  May 27, 1947.

LEE IRVIN SMITH ET AL.

It is hereby certified that errors appear in the printed specification of the above numbered patent requiring correction as follows: Column 4, line 27, for "14.11 hydrogen" read *14.11% hydrogen*; column 6, line 29, for "53,5%" read *53.5%*; and that the said Letters Patent should be read with these corrections therein that the same may conform to the record of the case in the Patent Office.

Signed and sealed this 16th day of September, A. D. 1947.

[SEAL]

THOMAS F. MURPHY,
*Assistant Commissioner of Patents.*